United States Patent
Cicchiello et al.

(10) Patent No.: US 7,557,979 B2
(45) Date of Patent: Jul. 7, 2009

(54) ELECTRO-OPTIC CRYSTAL, DIFFRACTION-BASED, BEAM-STEERING ELEMENT

(75) Inventors: James M. Cicchiello, Cary, IL (US); Curtis J. Harkrider, Wheaton, IL (US); Kenneth E. Kreischer, Barrington, IL (US); David A. Gallagher, Arlington Heights, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 122 days.

(21) Appl. No.: 11/890,436

(22) Filed: Aug. 6, 2007

(65) Prior Publication Data
US 2008/0259435 A1    Oct. 23, 2008

Related U.S. Application Data

(62) Division of application No. 11/005,124, filed on Dec. 6, 2004, now Pat. No. 7,411,724.

(51) Int. Cl.
*G02F 1/03* (2006.01)
*G02F 1/07* (2006.01)
*G02F 1/29* (2006.01)

(52) U.S. Cl. .................. 359/254; 359/251; 359/245; 359/315; 359/322

(58) Field of Classification Search .................. 359/315, 359/316, 322, 252, 254–256, 259
See application file for complete search history.

(56) References Cited

U.S. PATENT DOCUMENTS 7,057,787 B2 *  6/2006  Cicchiello et al. ........... 359/251
7,411,724 B2 *  8/2008  Cicchiello et al. ........... 359/322

* cited by examiner

*Primary Examiner*—Ricky L Mack
*Assistant Examiner*—Brandi N Thomas
(74) *Attorney, Agent, or Firm*—Stetina Brunda Garred & Brucker

(57) ABSTRACT

A beam-steering element made of a more optically-active material, potassium tantalate niobate, with an improved diffraction efficiency, having a plurality of electrode layers and one electro-optic crystal layer interposed between every two adjacent electrode layers. Each electro-optic crystal layer and the electrode layer adjacent thereto have an aspect ratio of about 1:1. The electrode layers and the electro-optic crystal layers are interposed between two substrates. Preferably, the substrates are transparent to an incoming beam to be modulated by the electro-optic crystal layer.

17 Claims, 12 Drawing Sheets

ELECTRO-OPTIC CRYSTAL, DIFFRACTION-BASED, BEAM-STEERING ELEMENT

CROSS-REFERENCE TO RELATED APPLICATIONS

The present application is a divisional of U.S. patent application Ser. No. 11/005,124 entitled EO-CRYSTAL, DIFFRACTIVE BASED, BEAM-STEERING ELEMENT filed Dec. 6, 2004 now U.S. Pat. No. 7,411,724.

STATEMENT RE: FEDERALLY SPONSORED RESEARCH/DEVELOPMENT

Not Applicable

BACKGROUND OF THE INVENTION

The present invention relates in general to an agile beam steering device and a method of fabricating the same, and more particular, to a diffraction-based beam-steering device made of electro-optic (EO) material.

Liquid-crystal techniques have been applied to the development of agile, dynamic-grating-based, that is, diffraction-based, beam-steering elements in recent years. Currently, the performance of a single element that uses the liquid-crystal techniques is limited to a steering angle of about ±3o with 50% diffraction efficiency and 1 sec frame-refresh rates.

As understood, the limitation of steering angle or liquid-crystal techniques is caused by the fly-back problem that reduces the diffraction efficiency. For example, Serati et al. has disclosed a device that can provide a theoretical steering angle as large as about ±17o. However, due to the diffraction inefficiency in real practice, the steering angle provided by such device is only about ±3o.

Recently, some researchers modeled the electrostatic fields associated with both liquid crystals and electro-optic crystals such as lithium niobate (LiNbO3) and lanthanum-modified lead zirconate titanate (PLZT) in a longitudinal-modulation configuration. The fly-back problem was found to be the result of lack of "crispness" in the spatial phases resets. That is, because of field fringing, the index of refraction gradient is not sharp enough at a given phase reset to facilitate a high-diffraction-efficiency blazed grating. The excessive field fringing is due to the large aspect ratio (AR) of the modulator thickness to electrode thickness, which is about 10:1 in the typical liquid-crystal design. It was also found that if the aspect ratio can be collapsed to about 1:1, the field-fringing problem could be mitigated.

However, in the liquid-crystal based design, it appears that the aspect ratio is set to be 10:1 due to fabrication limitation. Designs based on electro-optic crystals may facilitate a lower aspect ratio compared to liquid-crystal based design. But it has been a challenge historically in applying electro-optic crystals to agile beam steering due to insufficient electro-optic coefficients.

In fact there has demonstrated the use of electro-optic crystals in a dynamic phase grating. For example, researchers in the telecommunications industry have modulated LiNbO3 in waveguides to generate blazed gratings. Kulishov et al. have reported "interdigitated electrode (IDE) structures" for use in dynamically-controlled, in-fiber, blazed gratings. They worked with an electrode pitch of 4 µm and a waveguide thickness of 1 µm, and Δn was found about 0.004. However, they did not require the maximum phase shift φmax of about 2π that would be required by a blazed grating, and therefore their technology is not directly applicable to beam steering.

Other researchers have sought to apply electro-optic crystals more directly to the beam-steering challenge, but have only succeeded to date in steering through very fine angles. Thomas et al. have developed a dynamic grating based on PLZT, in which a maximum phase shift φmax of about 2π for about 0.632 µm is achieved by applying a voltage of 318V. The grating period was 400 µm, the modulator thickness was 350 µm, and a steering angle of about ±0.05o was achieved. In order to achieve higher steering angles, a more optically-active material is required.

BRIEF SUMMARY OF THE INVENTION

A beam-steering element made of a more optically-active material with an improved diffraction efficiency is provided. The beam-steering element comprises a plurality of electrode layers and one electro-optic crystal layer interposed between every two adjacent electrode layers. Each electro-optic crystal layer and the electrode layer adjacent thereto have an aspect ratio of about 1:1. The electrode layers and the optic crystal layers are interposed between two substrates. That is, the substrates must be transparent, particularly to an incoming optical beam to be modulated by the electro-optic crystal layer. In one embodiment, the incoming optical beam includes at least one optical beam having a wavelength of about 1.55 microns. The electrode layers are also transparent to the optical beam to be modulated by the electro-optic crystal layer. The surface figure of the electrode layers and the electro-optic layer is about 1/50 of the wavelength of the incoming optical beam. Each of the electrode layers includes a plurality of electrodes spaced from each other by a gap. When the electro-optic crystal layer has a thickness of about 1.5 microns, the pitch of the electrodes is preferably 1.5 microns to obtain the aspect ratio of about 1:1. Therefore, when the width of each electrode is about 1.0 micron, the width of each gap is about 0.5 microns. The electrodes are preferably fabricated from indium tin oxide or other transparent conductor, and the gaps are filled with an insulation material such as silicon oxide. It is very important that the electrodes of each electrode layer are aligned with the respective electrodes of the other electrode layers.

In one embodiment, each of the electrode layers includes as many as thousands of electrodes aligned in one row, in which each phase reset includes ten electrodes. Preferably, the electro-optical crystal layer is fabricated from a potassium tantalate niobate layer, and the thickness of the electro-optical crystal layer is about 1.5 microns. As the modulations of the optical beam produced by the electro-optical crystal layers are additive, a reflective layer may be coated on one of the substrate, such that a reflective-type agile beam-steering device can be realized.

In another embodiment of the present invention, an electro-optic crystal beam-steering element that comprises a first module and a second module is provided. Each of the first and second modules comprises a first substrate and a second substrate, at least three electrode layers interposed between the first and second substrates, and at least two electro-optic crystal layers interposed between each pair of the adjacent electrode layers. The second substrate of the first module is attached to the second substrate of the second module, where the second substrates are preferably thinner than the first substrates. An anti-reflection coating may be coated to the second substrate of at least one of the first and second modules to avoid reflection when light propagating from one module to another. The electrode layers and the first and second substrates are transparent to at least one incoming optical beam to be modulated by the electro-optic crystal layer. The incoming optical beam has a wavelength of about 1.55 microns, for example. Each of the electro-optic crystal layers has an aspect ratio of about 1:1 to its adjacent electrode layers. Each of the electrode layers includes an array of electrodes spaced from each other by a gap, which is filled with an insulation material. Both the electrode layers and the electro-optic layers are planarized to a surface flatness of about one fiftieth of the wavelength of an incoming optical beam to be modulated by the electro-optic crystal layers. The electro-optic crystal layers are fabricated from potassium tantalate niobate, for example.

A method of fabricating an agile beam-steering element is further provided. A first substrate and a second substrate are provided, and a first array of electrodes on each of the first and second substrates. The gaps between the electrodes are filled with an insulation material. An electro-optic crystal layer is optically contacted to each array of electrodes, followed by a polishing and planarization step to polish the electro-optic crystal layer to a predetermined thickness. In one embodiment, the predetermined thickness is about 1.5 microns. A second array of electrodes is formed on the electro-optic crystal layer of one of the first and second substrates. The first and second arrays of electrodes are aligned with each other, and the second array of electrodes is attached to the electro-optic crystal layer of the other substrate.

In the above method, the first and second substrates include transparent substrates, and the electrodes are preferably transparent, particularly to an optical beam to be steered by the agile beam-steering element. The electro-optical layers are preferably fabricated from potassium tantalate niobate. The gaps between the electrodes of each array are preferably filled with an insulation layer such as silicon oxide. The electro-optic crystal layers are polished to the predetermined thickness to obtain an aspect ratio to of about 1:1 to the adjacent array of electrodes. When the predetermined thickness is about 1.5 microns, the width of the electrodes of the first and second arrays of electrodes is about 1 micron, and the gaps are about 0.5 micron wide.

In one embodiment, a mirror layer is formed on one of the first and second substrates, such that a light propagating through the agile beam-steering device will be reflected and modulated again, so as to obtain a wider steering angle.

The present invention further provides a method of fabricating an agile beam-steering element which comprises the following steps. Two electro-optic modulation modules are provided, and each of the modulation modules is fabricated by the following processes. A first substrate and a second substrate are provided. A first number of electrode layers and a second number of electro-optic modulation layers are formed and alternately interposed between the first and second substrates. The first number is preferably larger than the second number by one. The modulation modules are then mated together by attaching the second substrates to each other. Preferably, the second substrates are thinner than the first substrate and have a thickness substantially the same as that of one of the electro-optic modulation layers. The first and second substrates and the electrode layers are transparent, particularly to an incoming beam to be modulated by the electro-optic modulation layers. Each of the electrode layers includes an array of electrodes spaced with each other by a gap filled by an insulation material such as silicon oxide. The electro-optic modulation layers are preferably fabricated from potassium tantalate niobate.

A method of fabricating an electro-optic, agile beam-steering device is further provided. The method includes a step of forming an electro-optic modulation layer and a plurality of electrodes having an aspect ratio of about 1:1. Preferably, the electro-optic modulation layer includes a potassium tantalate niobate.

An electro-optic, agile beam-steering device is provided. The device comprises an electro-optic modulation layer and a plurality of electrodes having an aspect ratio of about 1:1. The electro-optic modulation layer includes a potassium tantalate niobate layer.

DETAILED DESCRIPTION OF THE INVENTION

Potassium tantalate niobate (KTN) has been known to be a highly optically-active material since 1960's, but the application of potassium tantalate niobate has been very limited because the difficulty for fabrication. Potassium tantalate niobate is strongly dependent on temperature. In certain scenarios, the electro-optic coefficient of potassium tantalate niobate rc can reach as high as about 1800 pm/V, which is about 60 times more than the analogous electro-optic coefficient for lithium niobate (LiNbO3). The index of refraction of potassium tantalate niobate can be modulated with an applied voltage as:

$$\Delta n = \frac{n_c^3}{2} r_c E_z, \quad (1)$$

where $n_c$=2.277, and $E_z$ is the applied voltage. The difference of index of refraction results in an optical-path length OPL(x) of an optical beam propagating through the potassium tantalate niobate medium as:

$$OPL(t,x) = \int_0^l n(y) dy \quad (2)$$

where l is the thickness of the potassium tantalate niobate medium. The optical-path difference OPD(t,x) can then be obtained as:

$$OPD(t,x) = OPL(t,x) - OPL_{mean}(t,x) \quad (3),$$

where $OPL_{mean}(t,x)$ is the mean-removed optical-path length. The phase along the potassium tantalate niobate medium can thus be calculated as:

$$\phi = \frac{2\pi}{\lambda} OPD(t, x). \quad (4)$$

Preliminary analysis indicates that a thin stack of four potassium tantalate niobate modulators each having a thickness of about 1.5 microns can be fabricated. The electric field Ez applied to the stack is of about ±18V/1.5 micron, and a maximum phase reset $\phi$max of about $2\pi$ for each stack can be realized. Therefore, an agile steering device made of dynamic phase gratings based on potassium tantalate niobate is designed to facilitate a smaller aspect ratio, and thus mitigate the fly-back problem occurring to the liquid-crystal beam-steering techniques. A higher diffraction efficiency for a given steering angle can thus be obtained by such design. In addition, compared to the liquid-crystal beam-steering techniques, the beam-steering design based on potassium tantalate niobate also provides the benefits of higher switching speeds, transmissivity over broader wavelength regions, and durability with respect to exposure to ultra-violet (UV) radiation.

Figure 1:
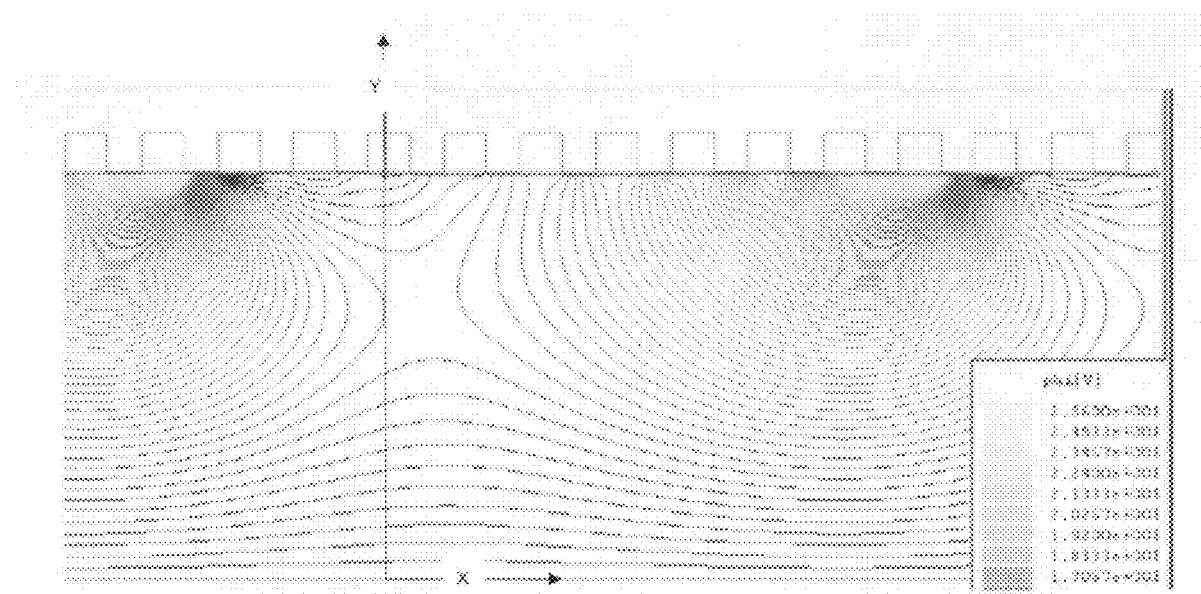
FIG. 1 shows a gradient of index of refraction in a liquid-crystal based beam-steering device.
Figure 2:
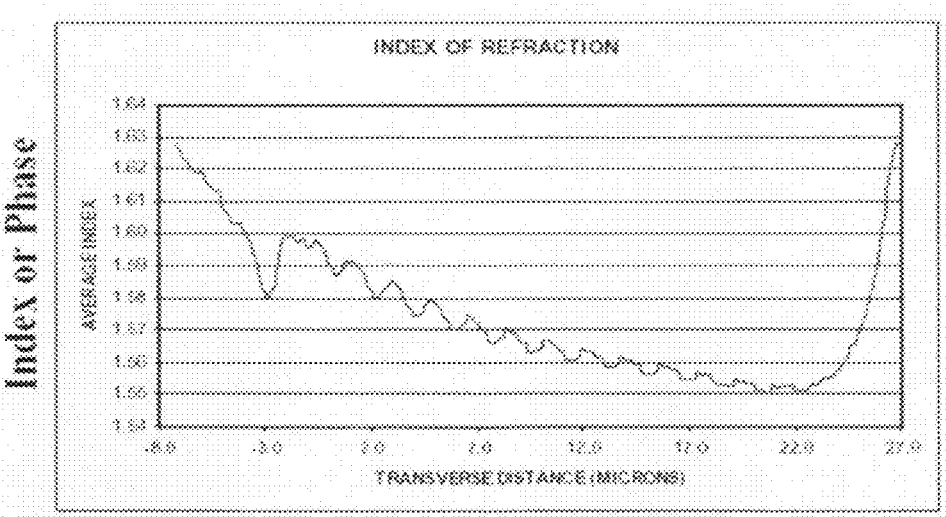
FIG. 2 shows the average index of refraction as a function of transverse distance across the liquid-crystal based beam-steering device as shown in FIG. 1.
Figure 3:
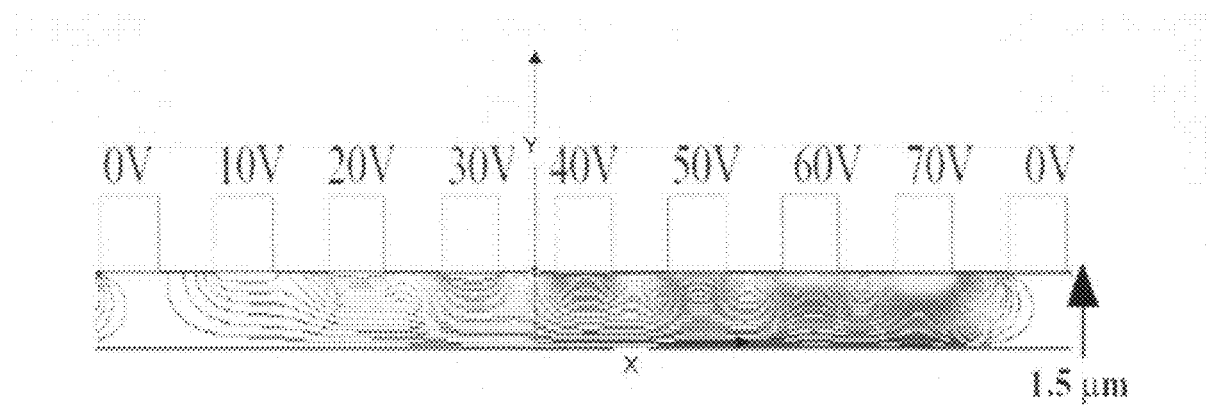
FIG. 3 shows a gradient of index of refraction of an electro-optic crystal based beam-steering device.
Figure 4:
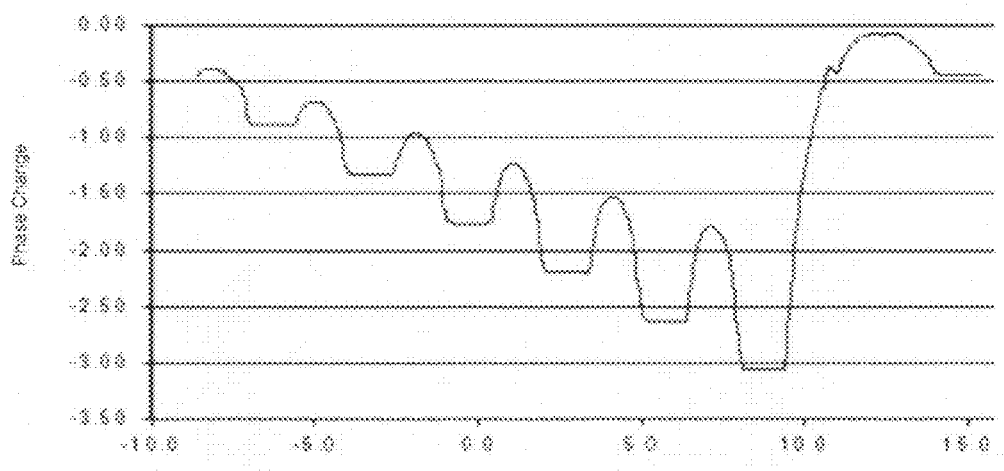
FIG. 4 shows the phase change along a transverse distance across the electro-optic crystal based beam-steering device as shown in FIG. 3.

FIGS. 1 and 3 illustrate the cross sectional views of a liquid-crystal beam modulator and an electro-optic beam modulator made from potassium tantalate niobate, respectively. As discussed above, the material nature restricts the minimum thickness of the liquid-crystal beam modulator to about 10 microns, which results in an aspect ratio of about 10:1. In contrast, the electro-optic beam modulator fabricated from potassium tantalate niobate beam modulator may be polished down to a thickness as thin as 1.5 microns, which results in an aspect ratio of about 1:1. By applying voltages between 0V to 5V to the liquid-crystal beam modulator, a gradient of index of refraction is produced as shown in FIG. 2. In FIG. 3, voltages between 0V to 70 V are applied to the electro-optic beam modulator to result in a gradient of index of refraction. The index-of-refraction in the electro-optic beam modulator as shown in FIG. 3 is much sharper than that in the liquid-crystal beam modulator as shown in FIG. 1. FIG. 2 shows the graph of the average index of refraction across the liquid-crystal beam modulator as shown in FIG. 1, while FIG. 4 shows that the phase change ranges between 0 to $-\pi$ for the electro-optic beam modulator as shown in FIG. 3.

Figure 5:
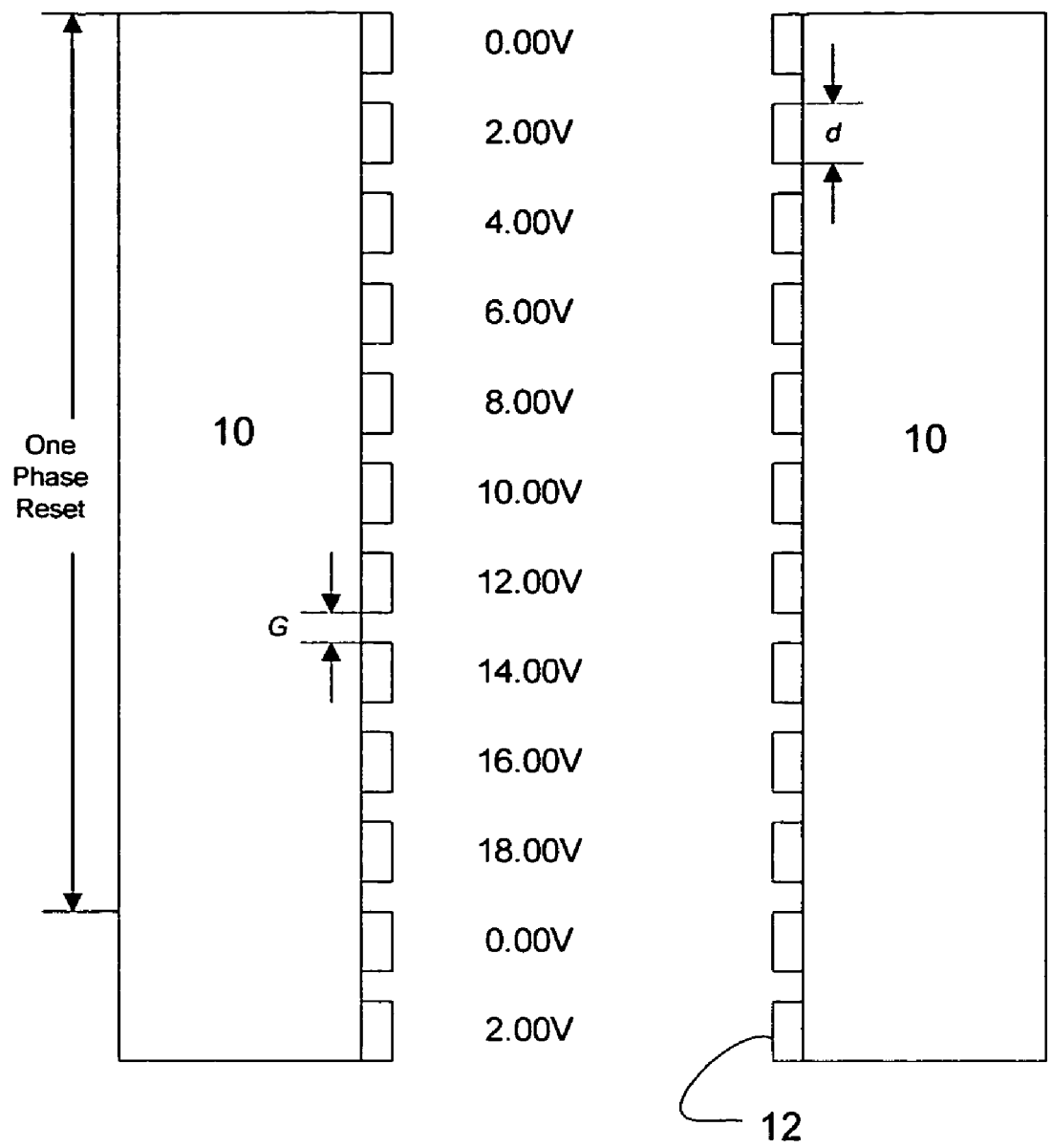
FIGS. 5-10 show the fabrication process of an electro-optic diffractive-based beam steering element.

FIGS. 5 to 9 show the fabrication of a diffraction-based beam-steering device module made of electro-optic (EO) material such as potassium tantalate niobate. In FIG. 5, a pair of substrates 10, such as glass substrate fabricated from fused silica, is provided. Preferably, the substrates 10 are transparent, particularly transparent to an incident light to be modulated. In this embodiment, the wavelength of the incident light is about 1.55 microns, for example. An array of electrodes 12 is formed on each substrate 10. The electrodes 12 are spaced from each other by a gap G of about 0.5 micron, and the width d of each electrode 12 is about 1.0 microns to result in a 1.5 microns pitch for the electrodes 12. In this embodiment, there are at least ten electrodes 14 per phase reset. The electrodes 12 are also transparent, particularly transparent to the incident beam to be modulated. Preferably, the electrodes 12 are fabricated from indium tin oxide (ITO), for example. Each pair of electrodes 12 is subjected to the same or different bias voltage. For example, the voltages applied thereto could range from 0V to 18V with an increment of 2V periodically.

Figure 6:
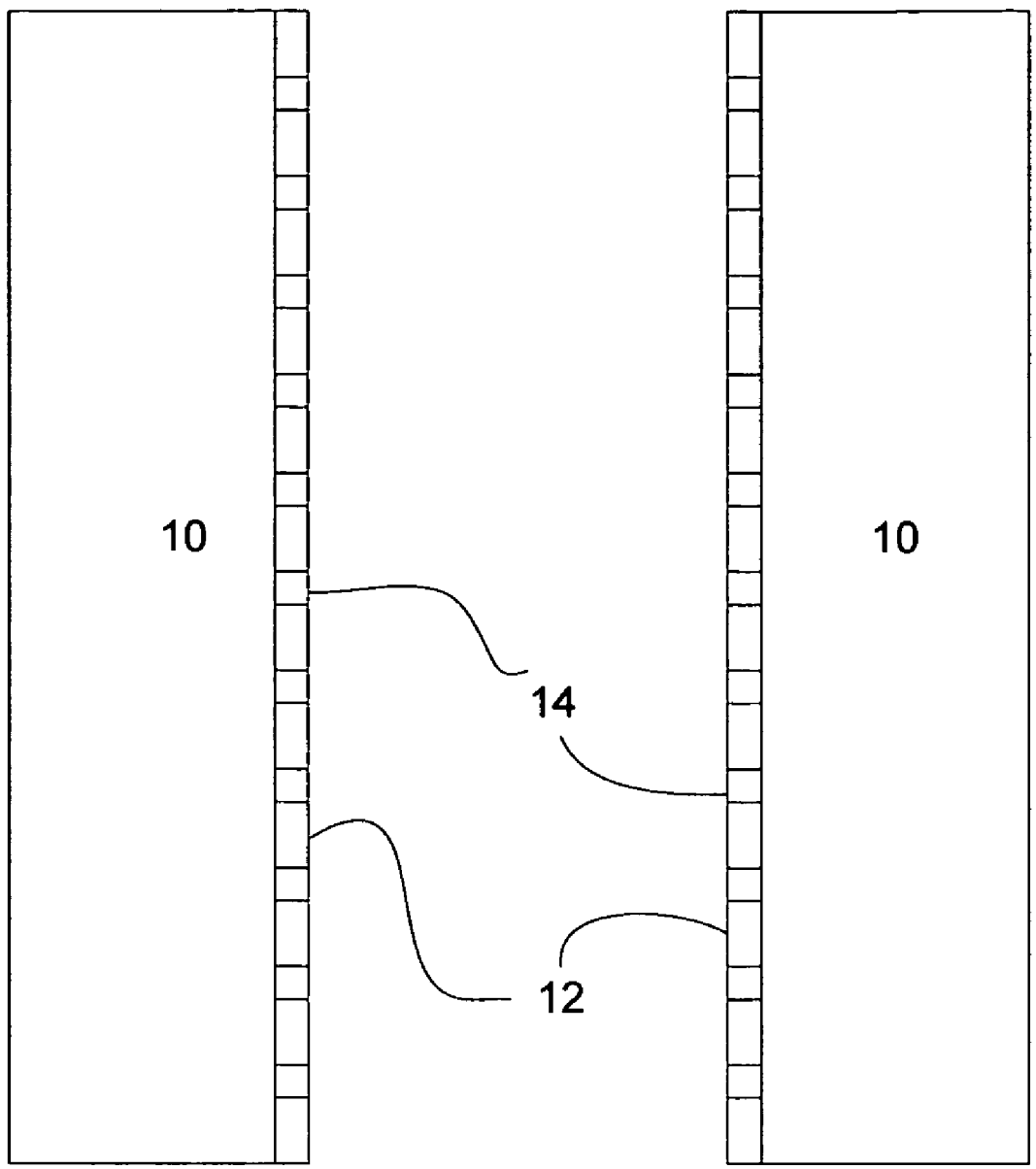

In FIG. 6, the gaps between the electrodes 12 on each substrate 10 are filled with an insulation material 14, such as silicon oxide (SiO2). The method of forming such insulation material 14 includes depositing a layer of silicon oxide to cover the electrodes 12 and the substrates 10 exposed at the gaps G between the electrodes 12, followed by a polishing or planarization process until the insulation material 14 is level with the electrodes 12 as shown in FIG. 6, and the surface figure (flatness) is about $\lambda/50$, that is, one fiftieth of the wavelength of the incident beam, for example.

Figure 7:
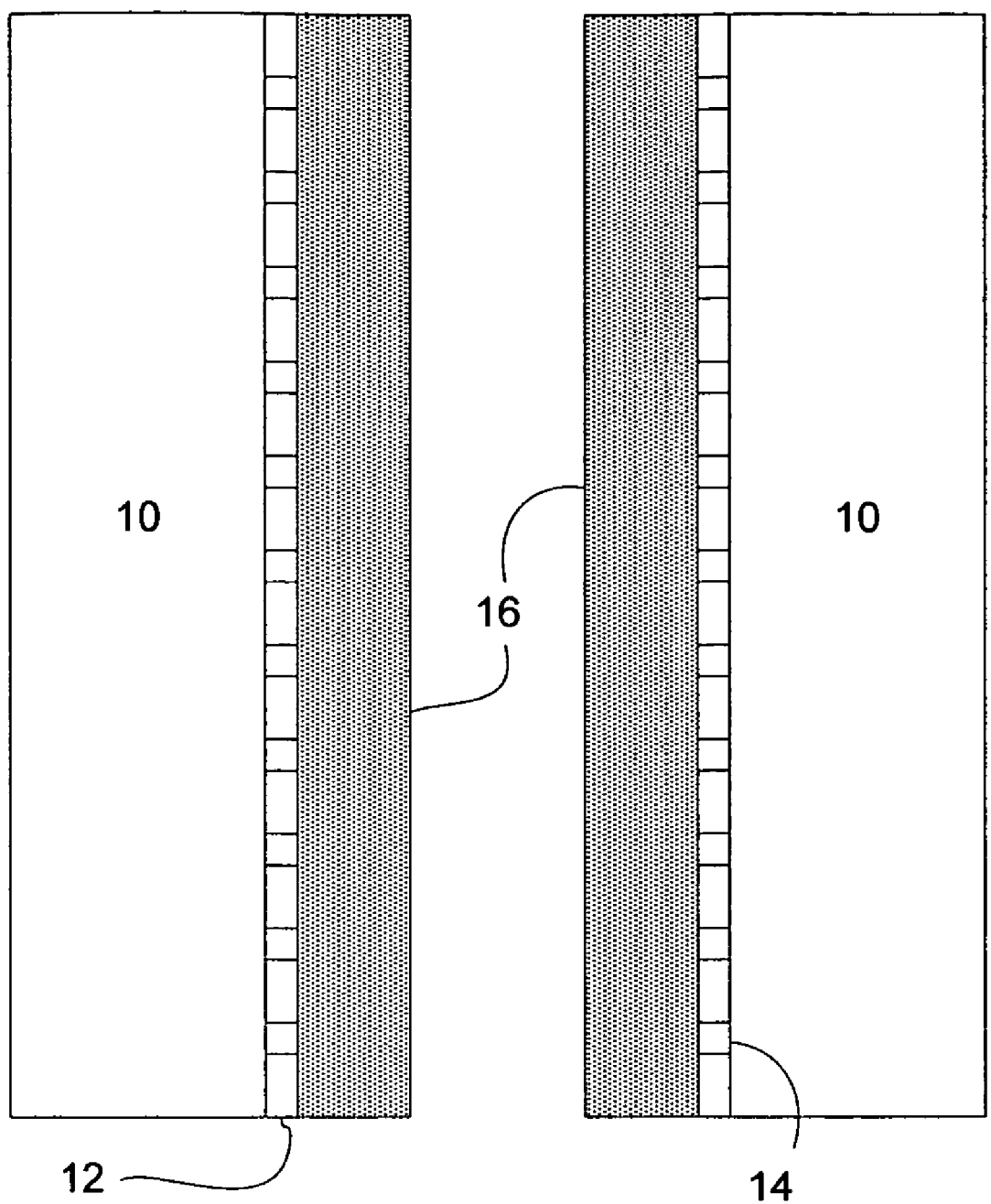
Figure 8:
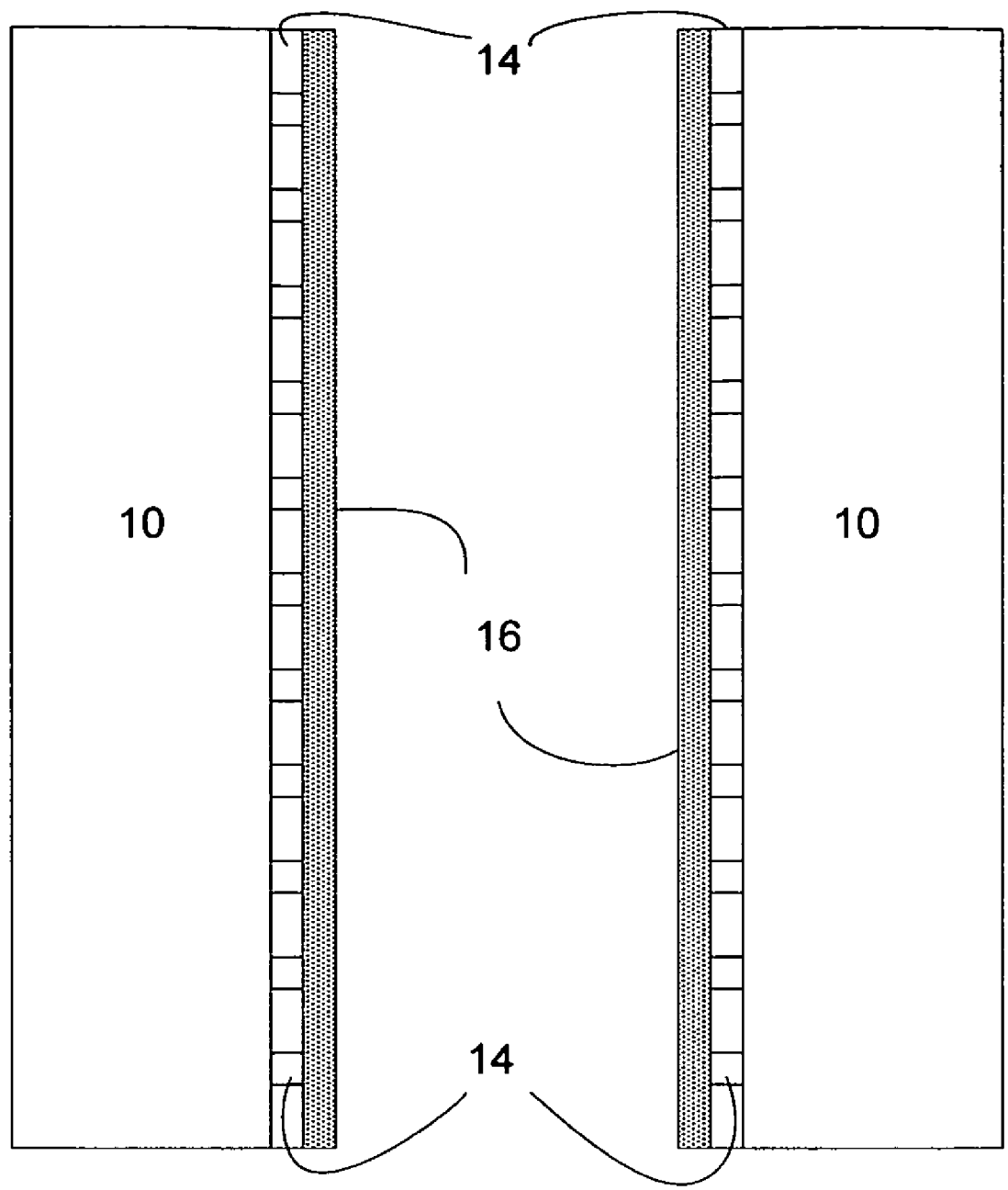

In FIG. 7, a modulation layer 16 fabricated from electro-optic material such as potassium tantalate niobate is optically contacted to both the electrodes 12 and the insulation material 14 on both substrates 10. The modulation layer 16 is then polished and planarized to a thickness of about 1.5 microns as shown in FIG. 8. Preferably, the surface figure of the polished potassium tantalate niobate layer 16 is about $\lambda/50$. As the pitch for the electrodes 12 is also about 1.5 micron, an aspect ratio of about 1:1 can be obtained to greatly enhance the diffraction efficiency, so as to obtain a wider steering angle.

Figure 9:
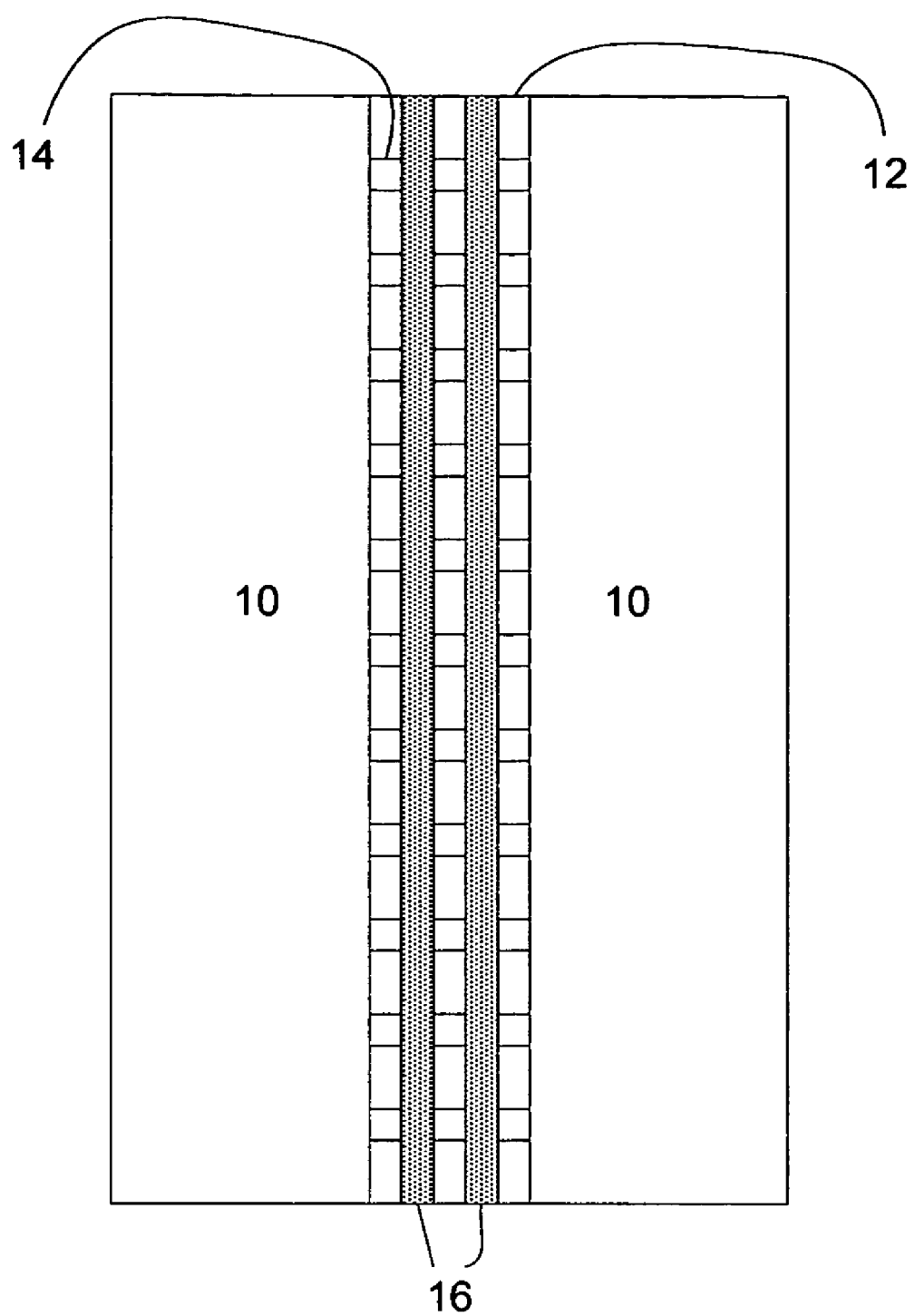

As shown in FIG. 9, a third array of electrodes 12 is formed on the potassium tantalate niobate layer 16 over one of the substrates 10. The corresponding electrodes 12 are aligned with each other, and the substrates 10 are connected to each other with the arrays electrodes 12 and the potassium tantalate niobate layers 16 alternately extending in between. Various techniques such as Moire technique can be used to align the corresponding electrodes 12.

Figure 10:
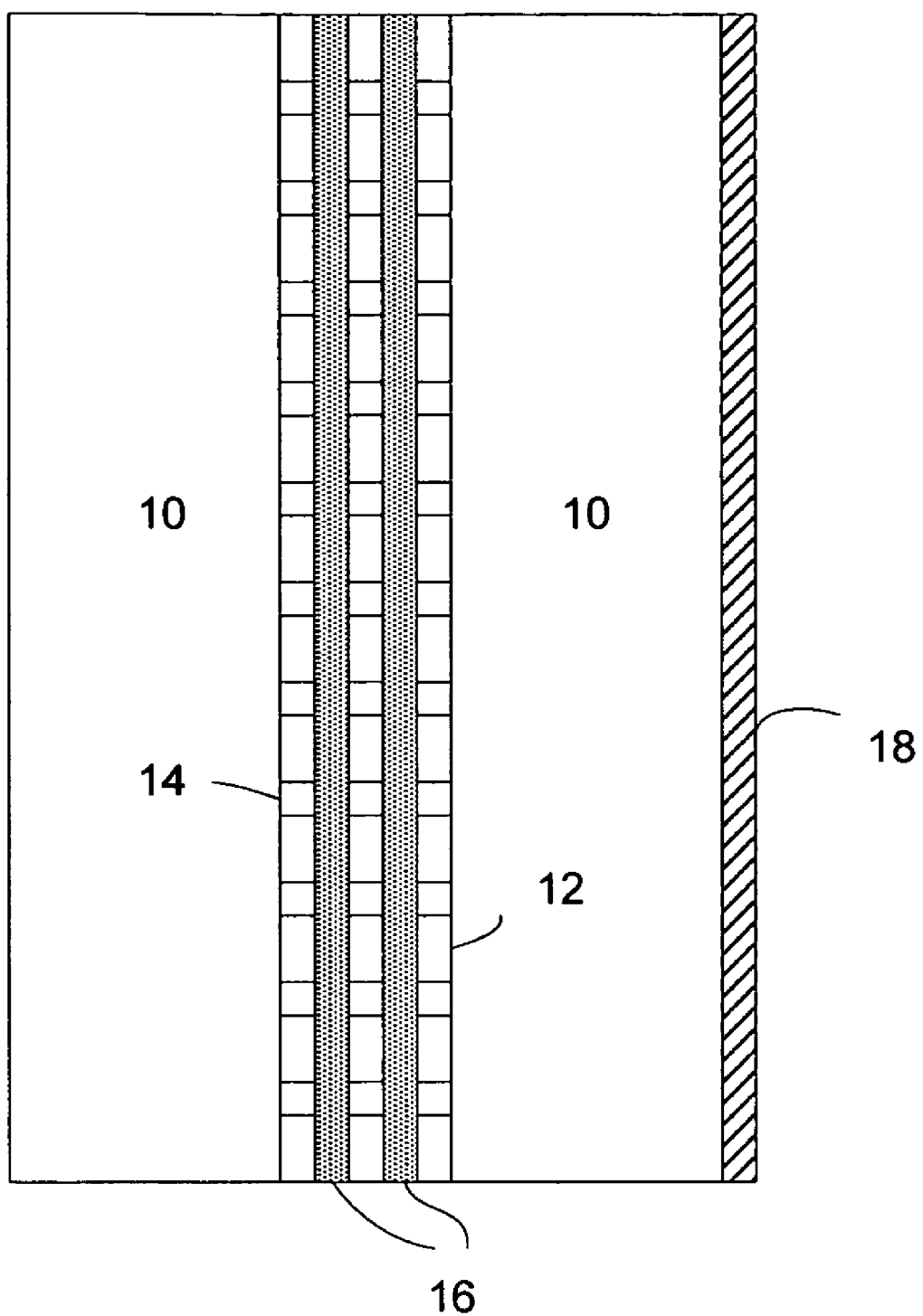

When an optical beam is incident on either side of the beam-steering device as shown in FIG. 9, by applying the applied voltages across the potassium tantalate niobate layers 16, a desired gradient of the refractive of index is obtained, which steers the incident optical beam with a required angle while emerging from the opposing side of the beam-steering device as shown in FIG. 9. The transmissive-type beam-steering device as shown in FIG. 9 can also be converted into a reflective-type beam steering device as shown in FIG. 10. In FIG. 10, a reflective layer such as a mirror layer 18 is coated on the exterior surface of one of the substrates 10. Therefore, when an optical beam incident from the opposing side of the device reaches the reflective layer 20, the optical beam is reflected thereby to propagate through the modulation layers, that is, the potassium tantalate niobate layers 16, again. The modulations of the incident and reflected optical beams are additive to obtain a larger steering angle.

Figure 11:
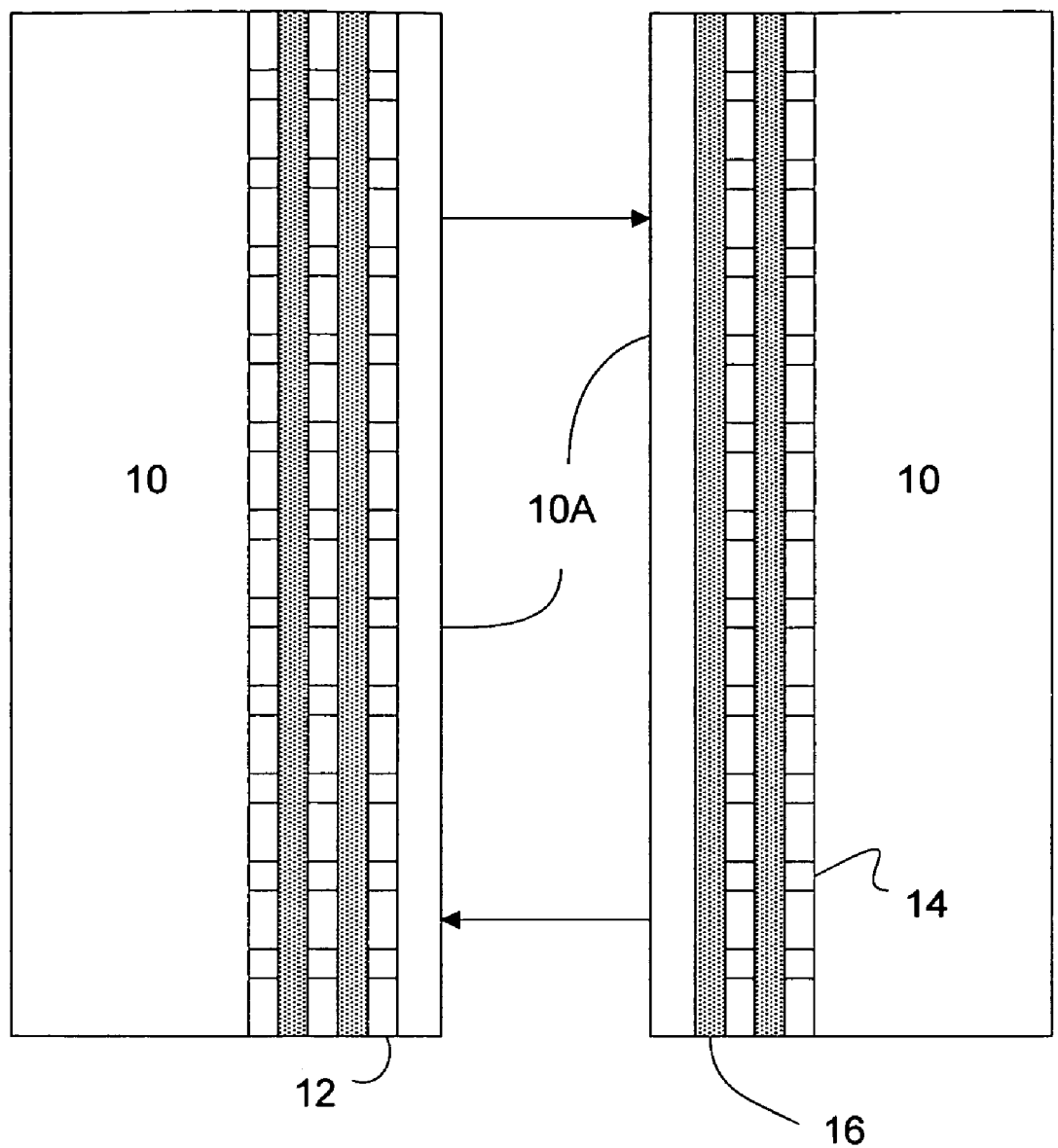
FIGS. 11-12 show additional fabrication process for modifying the electro-optic diffractive-based beam steering element as shown in FIG. 9.
Figure 12:
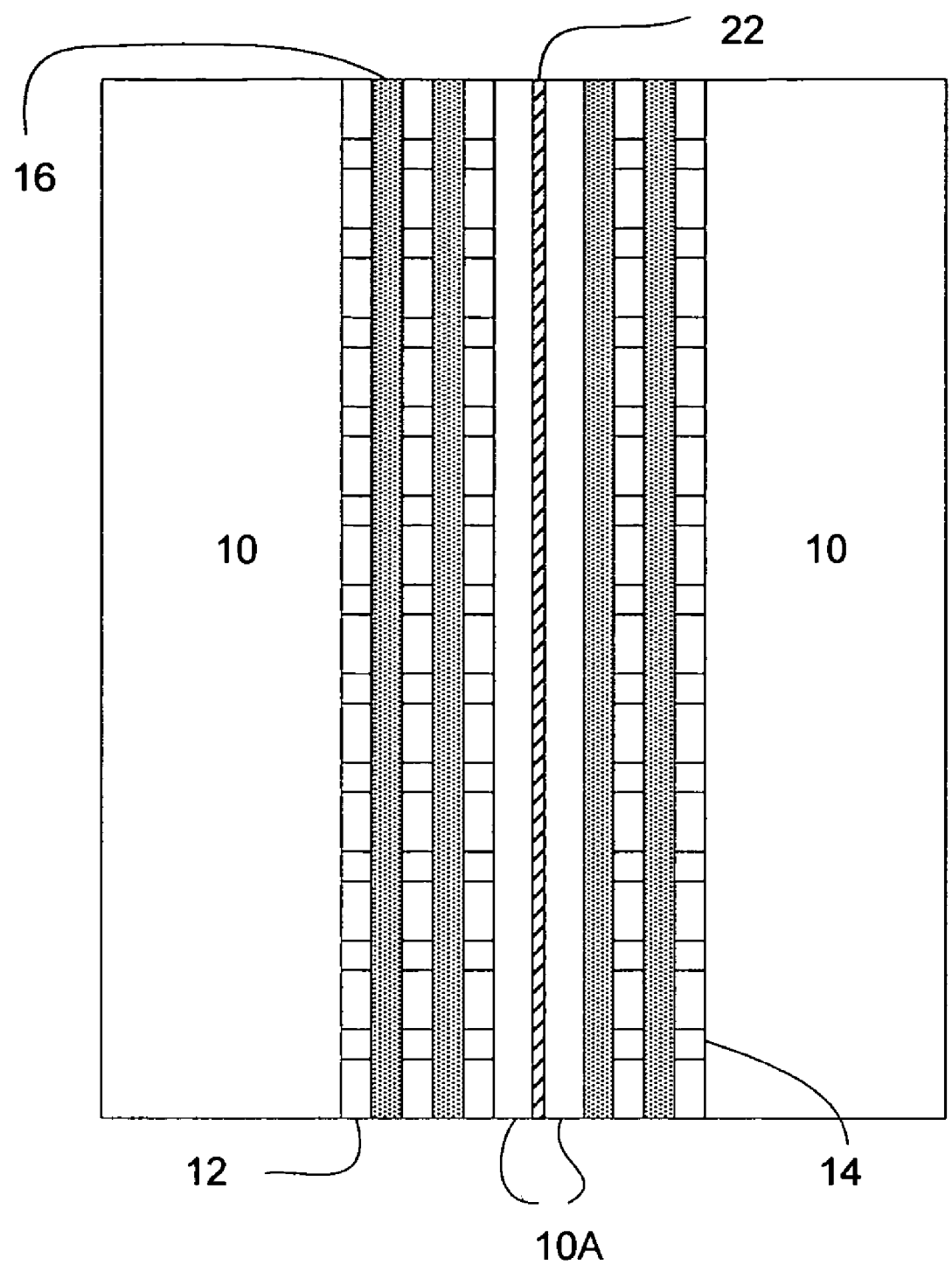

FIGS. 11 and 12 show a modification of the beam-steering device module as shown in FIG. 9. In FIG. 11, two beam-steering device modules as shown in FIG. 9 are provided. The substrate 10A of each module is further polished to a predetermined thickness. The polished substrates 10A are then attached to each other with the corresponding electrodes of each array 12 well aligned. Thereby, a transmissive-type beam-steering device is obtained as shown in FIG. 12. Preferably, an anti-reflection coating 22 may be applied to the interface between the substrates 10A, such that an optical beam propagating through the interface between the substrates 10A will not be reflected. The anti-reflection coating 22 may include two individual layers coated on the surfaces of both substrates 10A, or a single coating 22 coated on only one of the substrates 10A.

Figure 13:
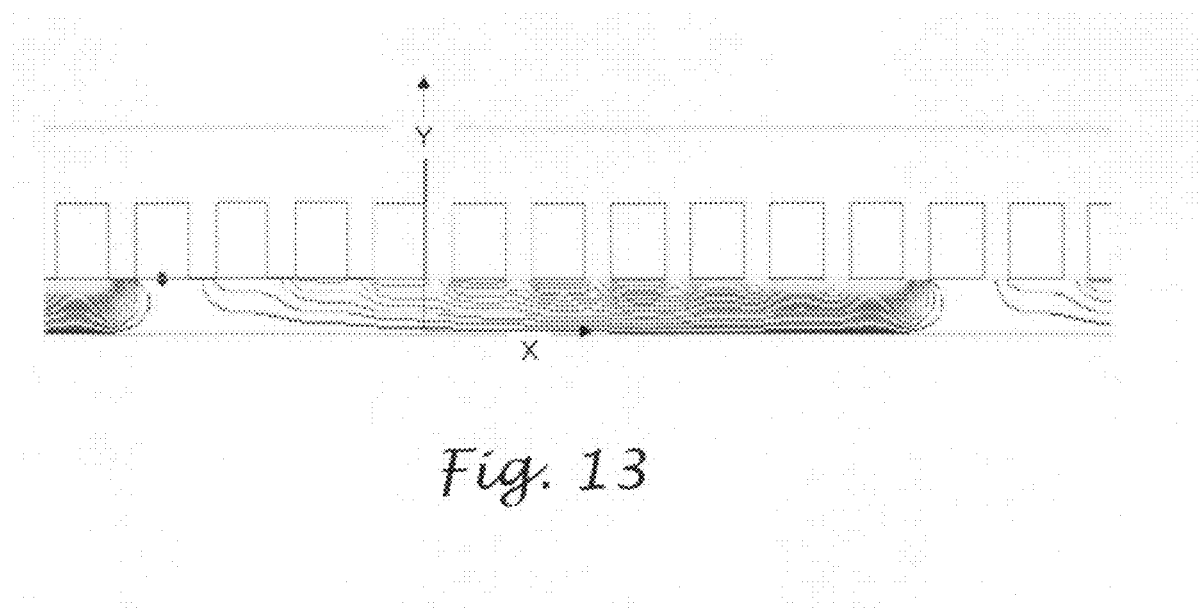
FIG. 13 shows the partial cross sectional view of the electro-optic diffractive-based beam-steering element as shown in FIG. 12.
Figure 14:
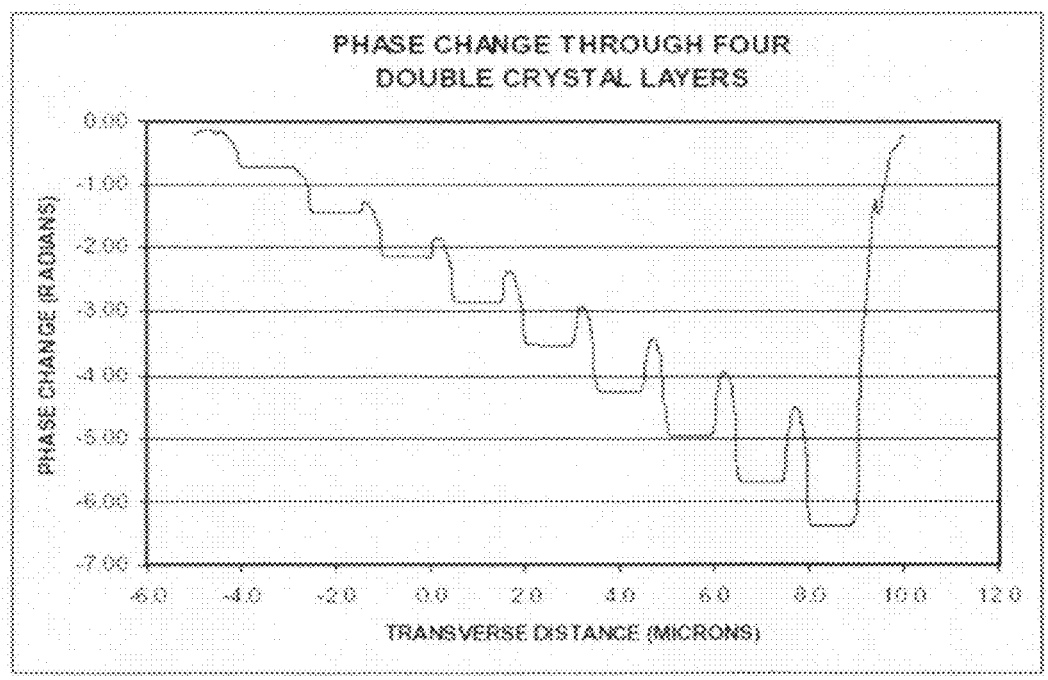
FIG. 14 shows the phase change of an incident beam as a function of transverse distance.
Figure 15:
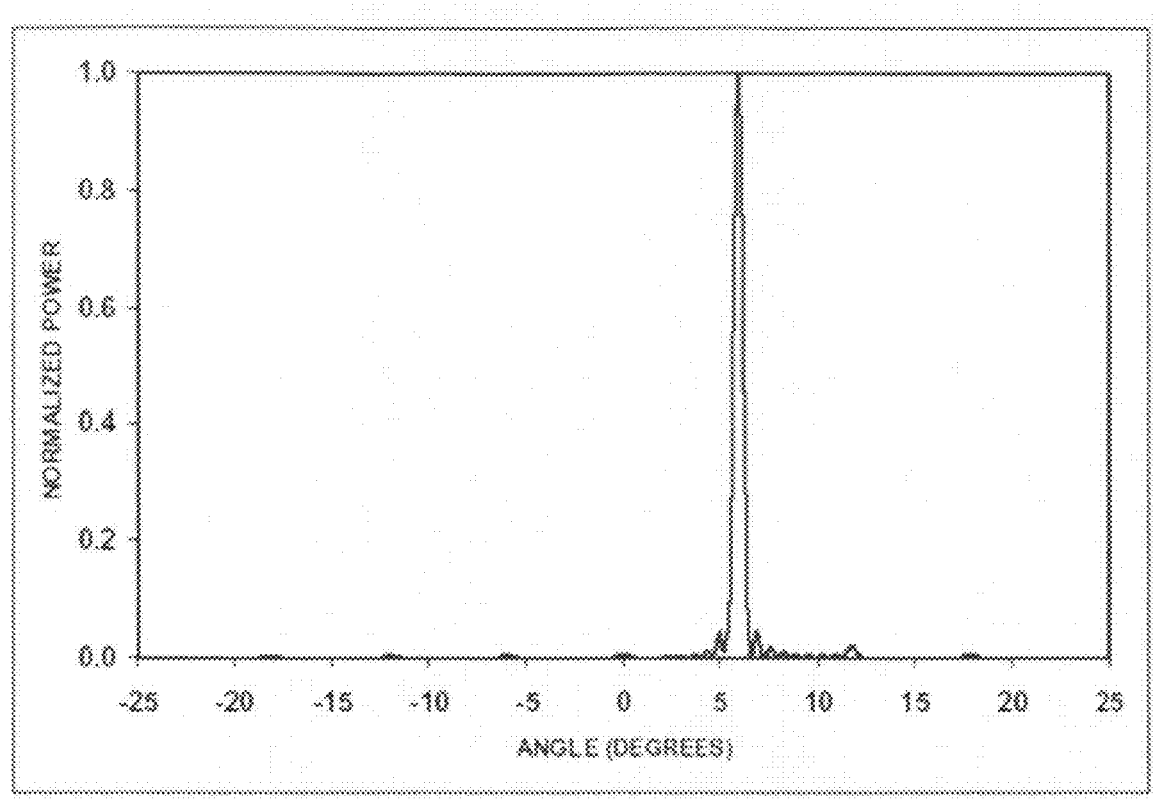
FIG. 15 shows the steering angle provided by the electro-optic diffractive-based beam-steering element.

FIG. 13 shows a partial cross sectional view of the transmissive-type beam-steering device as shown in FIG. 12, and FIG. 14 illustrates the phase change across the device. As shown in FIG. 14, the phase change ranges from 0 to $-2\pi$, which results in a diffraction efficiency of about 89% and a steering angle of about 6o as shown in FIG. 15.

It will be appreciated that although potassium tantalate niobate appears to be the most efficient electro-optic material used in the diffraction-based beam steering element as disclosed above, other electro-optic materials such as lithium niobate (LiNbO3), lanthanum-modified lead zirconate titanate (PLZT), and the like can also be used to fabricate such low-aspect-ratio beam-steering devices to obtain a high diffraction efficiency, so as to obtain a significant steering angle. Currently, device based on potassium tantalate niobate or similar high EO coefficient material will provide the greatest steering due to its highest electro-optics coefficient.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of fabricating an agile beam-steering element, comprising:
    providing a first substrate and a second substrate;
    forming a first array of electrodes on each of the first and second substrates, the electrodes of each first array are spaced from each other by a gap;
    filling the gaps between the electrodes by an insulation material;
    optically contacting an electro-optic crystal layer on each array of electrodes;
    polishing the electro-optic crystal layer;
    forming a second array of electrodes on the electro-optic crystal layer of one of the first and second substrates;
    aligning the first and second arrays of electrodes with each other; and
    connecting the second array of electrodes to the electro-optic crystal layer of the other substrate.

2. The method of claim 1, wherein the first and second substrates include transparent substrates.

3. The method of claim 1, wherein the electrodes are transparent.

4. The method of claim 1, further comprising forming the electro-optical layers of potassium tantalate niobate.

5. The method of claim 1, further comprising filling gaps between the electrodes of each array with an insulation layer.

6. The method of claim 1, further comprising filling the gaps with silicon oxide.

7. The method of claim 1, further comprising polishing the electro-optic crystal layer to obtain an aspect ratio of about 1:1 between the electro-optic crystal and the first and second arrays of electrodes.

8. The method of claim 1, further comprising forming the first array and the second array of electrodes with a thickness of about 1 micron.

9. The method of claim 1, further comprising forming the electro-optic crystal layers with a thickness of about 1.5 microns.

10. The method of claim 1, further comprising forming a mirror layer on one of the first and second substrates.

11. A method of fabricating an agile beam-steering element, comprising:
    forming two electro-optic modulation modules, wherein each of the modulation modules is fabricated by the process comprising:
        providing a first substrate and a second substrate;
        forming a first number of electrode layers and a second number of electro-optic modulation layers alternately interposed between the first and second substrates, wherein the first number is larger than the second number by one; and
    mating the modulation modules together by attaching the second substrates to each other.

12. The method of claim 11, wherein the second substrates are thinner than the first substrate.

13. The method of claim 11, wherein the second substrates have a thickness substantially the same as that of one of the electro-optic modulation layers.

14. The method of claim 11, wherein the first and second substrates and the electrode layers are transparent to an incoming beam to be modulated by the electro-optic modulation layers.

15. The method of claim 11, wherein each of the electrode layers includes an array of electrodes spaced with each other by a gap.

16. The method of claim 15, wherein the gaps are filled by an insulation material.

17. The method of claim 15, further comprising forming the electro-optic modulation layers from potassium tantalate niobate.

* * * * *